United States Patent
Shirakawa et al.

(10) Patent No.: US 10,016,678 B2
(45) Date of Patent: Jul. 10, 2018

(54) STORAGE MEDIUM STORING MOVEMENT CONTROLLING PROGRAM AND MOVEMENT CONTROLLING APPARATUS

(75) Inventors: Mari Shirakawa, Kyoto (JP); Giles Goddard, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 2499 days.

(21) Appl. No.: 12/076,599

(22) Filed: Mar. 20, 2008

(65) Prior Publication Data

US 2008/0297492 A1    Dec. 4, 2008

(30) Foreign Application Priority Data

May 29, 2007    (JP) .................. 2007-141392

(51) Int. Cl.
| | |
|---|---|
| G06F 3/048 | (2013.01) |
| A63F 13/426 | (2014.01) |
| A63F 13/2145 | (2014.01) |
| G06F 3/0486 | (2013.01) |
| G06F 3/0488 | (2013.01) |
| A63F 13/20 | (2014.01) |
| A63F 13/40 | (2014.01) |

(52) U.S. Cl.
CPC ............ *A63F 13/426* (2014.09); *A63F 13/06* (2013.01); *A63F 13/10* (2013.01); *A63F 13/2145* (2014.09); *G06F 3/0486* (2013.01); *G06F 3/0488* (2013.01); *A63F 2300/1075* (2013.01); *A63F 2300/6045* (2013.01); *A63F 2300/8011* (2013.01)

(58) Field of Classification Search
CPC ....................................................... G06F 3/048
USPC ........ 345/157, 159, 173, 474; 715/856, 857, 715/858, 861
See application file for complete search history.

(56) References Cited

U.S. PATENT DOCUMENTS

| | | | | |
|---|---|---|---|---|
| 5,515,489 | A  * | 5/1996 | Yaeger | 345/473 |
| 6,128,018 | A  * | 10/2000 | Nakajima | 345/419 |
| 6,336,864 | B1 * | 1/2002 | Nakanishi | 463/33 |
| 6,722,987 | B2 * | 4/2004 | Orr et al. | 463/31 |
| 2003/0195039 | A1* | 10/2003 | Orr et al. | 463/31 |
| 2006/0132457 | A1* | 6/2006 | Rimas-Ribikauskas et al. | 345/173 |
| 2006/0258445 | A1* | 11/2006 | Nishimori et al. | 463/30 |
| 2008/0297492 | A1* | 12/2008 | Shirakawa et al. | 345/179 |

FOREIGN PATENT DOCUMENTS

| | | |
|---|---|---|
| JP | 2005-193006 | 7/2005 |
| JP | 2006-149662 | 6/2006 |

* cited by examiner

*Primary Examiner* — Jeff Piziali
(74) *Attorney, Agent, or Firm* — Nixon & Vanderhye P.C.

(57) ABSTRACT

A movement controlling apparatus includes a pointing device for operating a movement of an object. A distance between a straight line connecting previous input coordinates and current input coordinates and a central point of the object is calculated. A velocity of the object is calculated on the basis of the distance to thereby control a movement of the object.

18 Claims, 13 Drawing Sheets

HIT DETERMINING AREA

HIT DETERMINATION IN A DIRECTION VERTICAL TO INPUT DIRECTION $cD < r+a$

FIG. 6
(A) LIMITATION OF f0
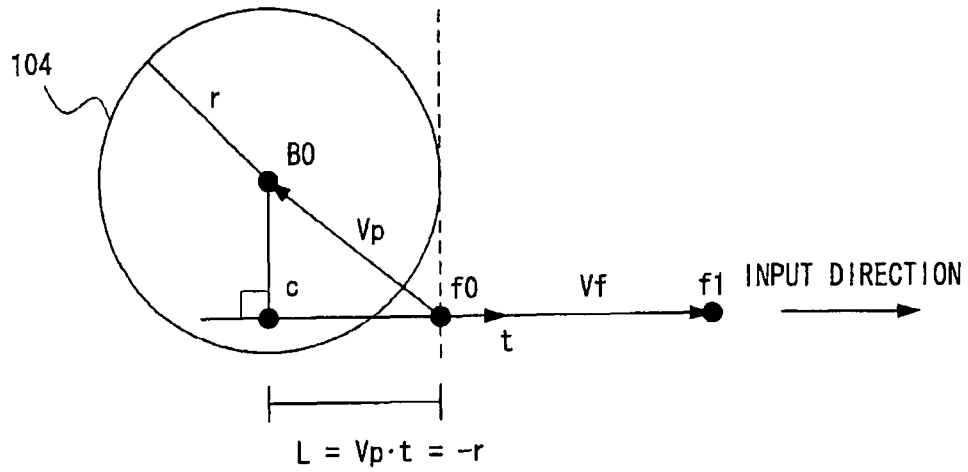
$L = V_p \cdot t = -r$
(B) LIMITATION OF f1
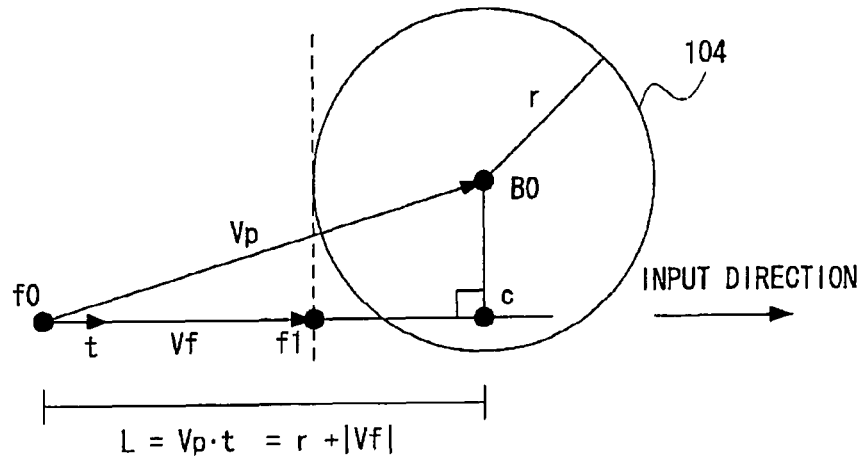
$L = V_p \cdot t = r + |V_f|$
(C) HIT DETERMINATION IN INPUT DIRECTION
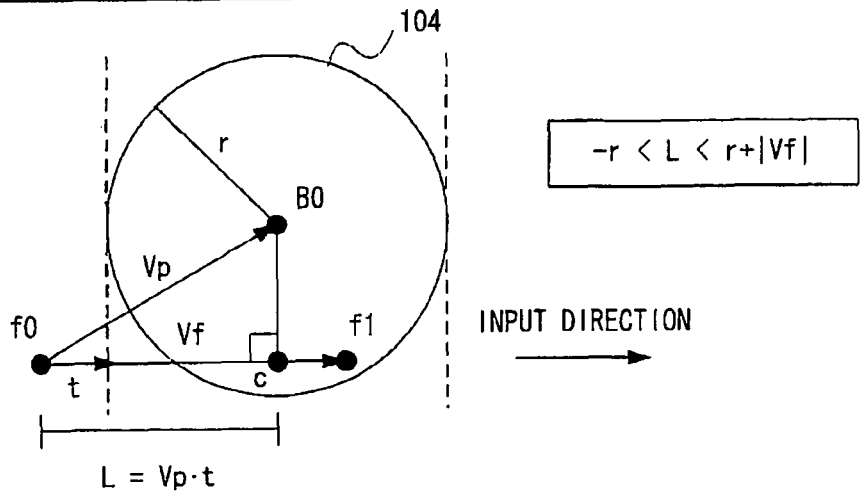
$-r < L < r + |V_f|$
$L = V_p \cdot t$ VELOCITY OF BALL IN NEXT FRAME v1:

$$v1 = v0 + (f1-f0) * k * ((r+a-cD)/(r+a))$$

FIG. 14
(A) WHEN L < 0
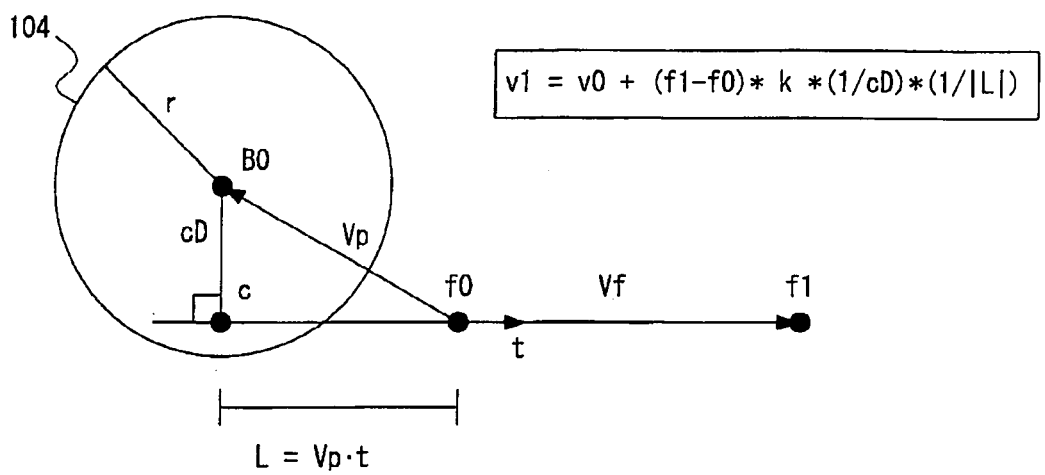
$v1 = v0 + (f1-f0) * k * (1/cD) * (1/|L|)$
(B) WHEN L > |Vf|
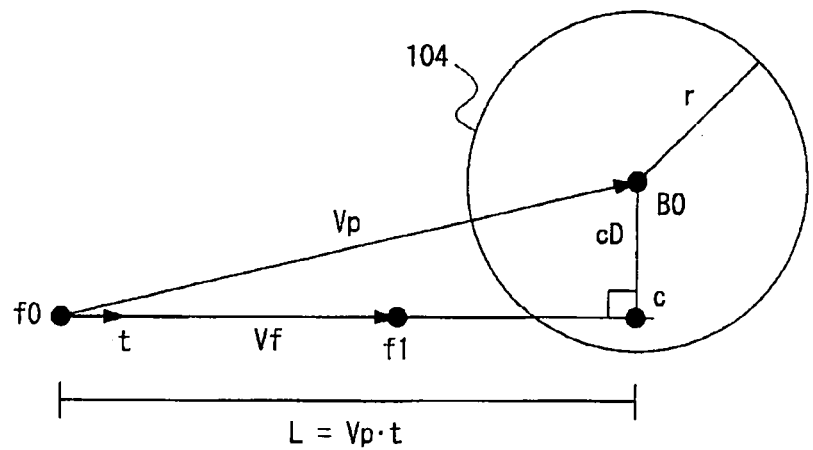
$v1 = v0 + (f1-f0) * k * (1/cD) * (1/(L-|Vf|))$

STORAGE MEDIUM STORING MOVEMENT CONTROLLING PROGRAM AND MOVEMENT CONTROLLING APPARATUS

CROSS REFERENCE OF RELATED APPLICATION

The disclosure of Japanese Patent Application No. 2007-141392 is incorporated herein by reference.

FIELD

The technology herein relates to a storage medium storing a movement controlling program and a movement controlling apparatus. More specifically, the technology relates to a storage medium storing a movement controlling program and a movement controlling apparatus which are for controlling a movement of an object displayed on a screen on the basis of an input from a pointing device.

BACKGROUND AND SUMMARY

Conventionally, an art for controlling a movement of an object displayed on a screen on the basis of an input form a pointing device, such as a touch panel, etc. is well known.

In a related art described in a Patent Document 1 (Japanese Patent Application Laid-Open No. 2005-193006), for example, it is determined whether or not position coordinates first detected from a touch panel are included in a display area of an operation object, and if the position coordinates first detected are included in the display area, the operation object is moved according to the input. More specifically, a continuous input time to the touch panel is measured, and a movement velocity of the object is calculated such that as the continuous input time is short, the initial velocity is high. Furthermore, position coordinates data at a time of starting an input to the touch panel (starting point) and position coordinates data at a time of ending the input (ending point) are detected, and a difference between the starting point and the ending point is calculated. The movement velocity of the object is calculated such that the wider the difference is, the higher the initial velocity is (and vice versa).

In addition, in a related art described in a Patent Document 2 (Japanese Patent Application Laid-Open No. 2006-149662), an operation object is moved by performing a stroke operation (stroking operation on the touch panel) at an arbitrary position on a touch panel. More specifically, a movement velocity of the object is calculated on the basis of a length of the stroking operation. For example, it is determined whether or not a difference of the touched coordinates is above a predetermined threshold value. When the object is stopped, if the difference is above the predetermined threshold value, a novel velocity is decided as a constant velocity A, and if the difference is equal to or less than the predetermined threshold value, a novel velocity is decided as 0. Furthermore, while the object moves, if the difference is equal to or less than the predetermined threshold value, a novel velocity is calculated by subtracting deceleration (B+α) larger than a constant deceleration B from the constant velocity A, and if the difference is above the predetermined threshold value, a novel velocity is decided as a constant velocity A.

The arts in the above-described Patent Documents 1 and 2 are not such kinds of deciding a movement velocity of an object on the basis of a distance between a straight line connecting two input coordinates and a target to be operated.

Furthermore, in the art of the Patent Document 1, the player has to perform an operation for a movement control by touching the object. If a plurality of objects is displayed on the screen, a size of each of the objects is small to make it difficult to instruct each of the objects with the pointing device, resulting in low operability.

On the other hand, in the related art of the Patent Document 2, the user can move the object by performing a stroking operation at an arbitrary position on the touch panel without touching the object. In a case of one object, such a movement control can be applied while in a case that there is a plurality of operation objects, it cannot be applied.

Therefore, example embodiments provide a novel storage medium storing a movement controlling program and a novel movement controlling apparatus.

Certain example embodiments provide a storage medium storing a movement controlling program and a movement controlling apparatus which are able to control a movement of an object in various ways.

Certain example embodiments provide a storage medium storing a movement controlling program and a movement controlling apparatus which offer high operability for a movement control of an object.

Certain example embodiments employ the following features in order to solve the above-described problems. It should be noted that reference numerals inside the parentheses and supplement show one example of a corresponding relationship with the embodiments described herein.

In an example embodiment a storage medium storing a movement controlling program to be executed in a computer of a movement controlling apparatus provided with a display means for displaying at least an operation object to be operated by a player on a screen and a pointing device for instructing a position on the screen of the display means. The movement controlling program causes the computer to execute an input coordinates detecting step, a distance calculating step, a movement velocity calculating step, and a movement processing step. The input coordinates detecting step detects input coordinates indicating a position on the screen to be instructed by the pointing device for each predetermined time. The distance calculating step calculates a distance between a straight line connecting previous input coordinates and current input coordinates which are detected by the input coordinates detecting step and the operation object. The movement velocity calculating step calculates a movement velocity of the operation object on the basis of the distance calculated by the distance calculating step. The movement processing step moves the operation object on the basis of the movement velocity calculated by the movement velocity calculating step.

In an example embodiment, a movement controlling apparatus (10) includes a display means (12, 14) and a pointing device (24). A movement controlling program causes a computer (34) of the movement controlling apparatus to execute steps described below, and controls a movement of the operation object (104) displayed on the screen by an input of the pointing device. An input coordinates detecting step (S9, S43, S45) detects input coordinates indicative of an instructed position on the screen for each predetermined time. A distance calculating step (S53, S55) calculates a distance (cD) between a straight line connecting previous input coordinates (f0)) and current input coordinates (f1) and the operation object. For example, an intersection point (c) between a perpendicular line dropped from the reference point (center point B0) of the operation object and a straight line between the input coordinates is calculated, and then, a distance between the intersection point and the reference point may be calculated. A movement velocity calculating step (S65) calculates a movement velocity (v1) of the operation object on the basis of the calculated distance. For example, a current movement velocity vector (v0) and the input vector depending on a distance are combined to thereby calculate a movement velocity vector. A movement processing step (S19) moves the operation object on the basis of the calculated movement velocity.

In certain example embodiments, since the movement velocity is calculated on the basis of the distance between the straight line between the input coordinates and the operation object, the movement velocity of the operation object can be changed depending on the distance, capable of controlling the movement of the operation object in various ways.

Another example embodiment includes a storage medium storing a movement controlling program where the movement velocity calculating step increases the movement velocity as the distance is short.

In certain example embodiments, as the distance between the straight line between the input coordinates and the operation object is short, the movement velocity of the operation object can be increased, capable of offering reality to the movement control of the operation object.

In certain example embodiments, a storage medium storing a movement controlling program and the movement controlling program causes the computer to further execute a nearest point calculating step. The nearest point calculating step calculates a nearest point to the reference point of the operation object out of the points in the straight line. The distance calculating step calculates a distance between the nearest point calculated by the nearest point calculating step and the reference point of the operation object.

In certain example embodiments, a nearest point calculating step (S53) calculates a nearest point to a reference point of the operation object (c) out of the points in the straight line. The reference point of the operation object is a center point, a center of gravity, etc., and the operation object is arranged at a position of the reference point in the game space. The distance calculating step calculates a distance between the nearest point and the reference point.

In certain example embodiments, the movement velocity can be calculated on the basis of the shortest distance between the straight line between the input coordinates and the operation object, and therefore, it is possible to change the movement velocity of the operation object how accurately the position instructed by the pointing device captures the operation object.

In certain example embodiments, a storage medium storing a movement controlling program includes where the operation object is a circular object and where the movement controlling program causes the computer to execute a hit determining step. The hit determining step determines whether or not an area set on the basis of an input direction from the previous input coordinates to the current input coordinates and a radius of the circular object, and an input line segment connecting said previous input coordinates and said current input coordinates intersect with each other. The movement velocity calculating step calculates a movement velocity of the circular object on the basis of the distance when it is determined by the hit determining step that the area and the input line segment intersects with each other.

In certain example embodiments, the operation object is a circular object. The circular object is set with a hit determining area on the basis of the radius (r) and an input direction by the player. More specifically, a hit determination step (S59, S61) determines whether or not an area set on the basis of an input direction from the previous input coordinates to the current input coordinates and the radius, and an input line segment intersect with each other. The hit determination may be separately performed in relation to a direction vertical to the input direction and in relation to the input direction. Furthermore, the wideness of an effective area in the direction vertical to the input direction and the wideness of the effective area in the input direction may be set to be different from each other. The movement velocity calculating step calculates a movement velocity on the basis of the distance when the area and the input line segment intersect with each other.

In certain example embodiments, only when an input to the effective area which is set based on the radius of the circular object and an input direction by the player is made, a movement of the object can be operated.

In certain example embodiments, a storage medium storing a movement controlling program includes where the movement velocity calculating step includes a difference calculating step for calculating a difference between the previous input coordinates and the current input coordinates which are detected by the input coordinates detecting step, and calculates a movement velocity of the operation object on the basis of the difference further.

In certain example embodiments, when the movement velocity is calculated, a difference (f1−f0) between the previous input coordinates and the current input coordinates is calculated. The movement velocity is calculated on the basis of the distance and the difference.

In certain example embodiments, since the movement velocity of the operation object is calculated on the basis of the difference between the input coordinates in addition to the distance between the straight line between the input coordinates and the operation object, the movement of the operation object can be controlled in various ways, capable of increasing reality during movement.

In certain example embodiments a movement controlling apparatus provided with a display means for displaying at least an operation object to be operated by a player on a screen and a pointing device for instructing a position on the screen of the display means, and controlling a movement of the operation object according to an input by the pointing device. The movement controlling apparatus comprises an input coordinates detecting means, a distance calculating means, a movement velocity calculating means, and a movement processing means. The input coordinates detecting means detects input coordinates indicating a position on the screen to be instructed by the pointing device for each predetermined time. The distance calculating means calculates a distance between a straight line connecting previous input coordinates and current input coordinates which are detected by the input coordinates detecting means and the operation object. The movement velocity calculating means calculates a movement velocity of the operation object on the basis of the distance calculated by the distance calculating means. The movement processing means moves the operation object on the basis of the movement velocity calculated by the movement velocity calculating means.

In certain example embodiments, a movement controlling apparatus corresponding to a storage medium storing a movement controlling program is provided and have one or more similar advantages to those described herein.

In certain example embodiments, since the operation object can be moved at the movement velocity calculated on the basis of the distance between the straight line connecting the input coordinates and the operation object, it is possible to change the movement velocity of the operation object depending on the distance. That is, it is possible to control the movement of the operation object in various ways.

Furthermore, since the movement velocity is calculated on the basis of the distance, even if a plurality of operation objects exists, it is possible to control a movement velocity of each of the operation objects on the basis of the distance between the straight line connecting the input coordinates and each of the operation objects. Thus, operability for a movement control of the object is enhanced.

The above described objects and other objects, features, aspects and advantages of certain example embodiments will become more apparent from the following detailed description when taken in conjunction with the accompanying drawings.

BRIEF DESCRIPTION OF THE DRAWINGS

FIG. 6 is an illustrative view for explaining a hit determination in an input direction;

FIG. 14 is an illustrative view explaining calculation of a movement velocity in a still another embodiment.

DETAILED DESCRIPTION

Figure 1:
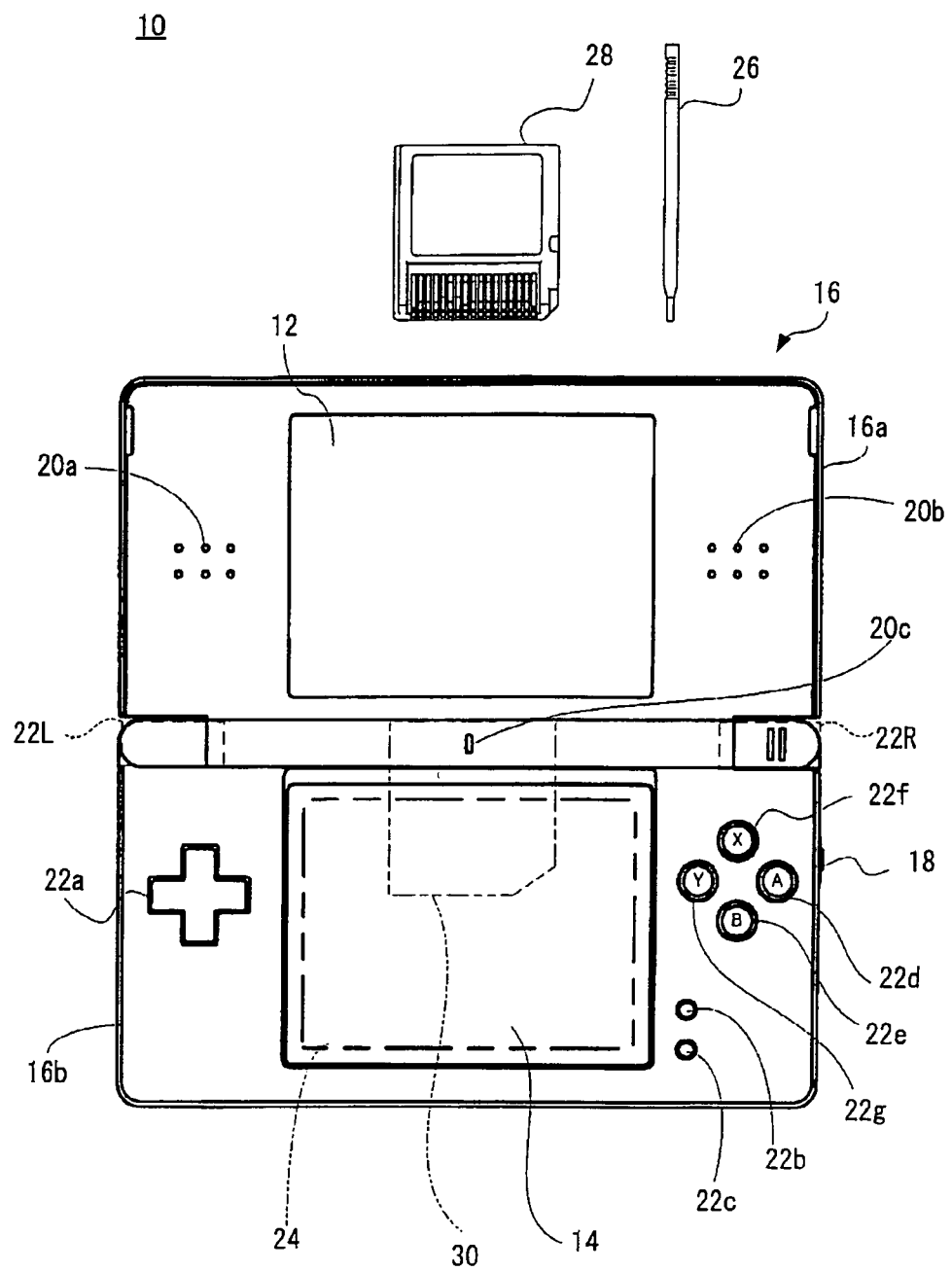
FIG. 1 is an illustrative view showing one embodiment of a movement controlling apparatus.

Referring to FIG. 1, a movement controlling apparatus 10 of an embodiment is realized in a form of a game apparatus. Alternatively, the movement controlling apparatus 10 may be realized in other forms, such as a personal computer, a hand-held information terminal, a cellular phone, etc.

The movement controlling apparatus, that is, the game apparatus 10 includes a first liquid crystal display (LCD) 12 and a second LCD 14. The LCD 12 and the LCD 14 are set on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a shape and a size approximately the same as the upper housing 16a, and has an opening formed so as to expose a display surface of the LCD 14 at an approximately center of the horizontal direction. Also, a power switch 18 is provided at the right side surface of the lower housing 16b.

Furthermore, the upper housing 16a is provided with sound release holes 20a and 20b for speakers 36a and 36b (FIG. 2) on both sides of the LCD 12.

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone (not illustrated) is formed at the center of the connected portion between the upper housing 16a and the lower housing 16b. This makes it possible to perform game processing on the basis of a sound signal by a sound, a voice or a breath taken from the microphone.

Furthermore, the lower housing 16b is provided with an operating switch 22 (22a, 22b, 22c, 22d, 22e, 22L and 22R).

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. Other switches 22b-22g are arranged at the right of the LCD 14 on the one surface of the lower housing 16b. In addition, the operating switches 22L and 22R are arranged at the right and left corners on the upper side surface of the lower housing 16b. It should be noted that action switches 22L and 22R are provided on a back surface of the lower housing 16b, and shown by dotted line because they are hidden under the connected portion in a front view as shown in FIG. 1.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operation to the A button 22d and B button 22e. Of course, the X button 22f and the Y button 22g are not necessarily utilized in the game play.

The action switch (left depression button) 22L and the action switch (right depression button) 22R are formed by the push button, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position of the stick 26, etc. (that is, touched) to output coordinates data corresponding to the detected coordinates.

It should be noted that in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, and characters like a player object are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Furthermore, by utilizing the two LCD 12 and LCD 14 as one screen, it is possible to display a large monster (enemy object) to be defeated by the player object.

Accordingly, the player is able to point (operate) an image such as a player object, an enemy object, an item object, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the virtual game space (three-dimensional game space), and instruct a scrolling (gradual moving display) direction of the game screen (map).

It should be noted that depending on the kind of the game, other input instructions can be made with the use of the touch panel 24. For example, it is possible to input by hand texts, numbers, symbols, etc. on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

Although the first LCD 12 and the second LCD 14 are vertically arranged, the arrangement of the two LCDs may be changed as necessary. In another embodiment, the first LCD 12 and the second LCD 14 may be horizontally arranged.

Furthermore, in this embodiment, two LCDs are provided, but the number of LCDS as a display means can be changed as necessary. In another embodiment, a vertically-long LCD is provided, and by vertically dividing the display areas into two, two game screens may be displayed on the respective display areas, or a horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on an upper edge surface of the lower housing 16b. Although omitted in FIG. 1, a connector 32 (see FIG. 2) is provided at a depth portion of the loading slot 30 for connecting a connector provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

It should be noted that although not illustrated in FIG. 1, the speakers 36a and 36b (see FIG. 2) are provided at positions corresponding to the sound release holes 20a and 20b inside the upper housing 16a.

Furthermore although omitted in FIG. 1, for example, a battery accommodating box is provided on a rear surface of the lower housing 16b, a volume switch, an earphone jack, etc. are provided on the lower edge surface (bottom surface) of the lower housing 16b, and an external expansion connector is provided on the upper edge surface (top surface).

Figure 2:
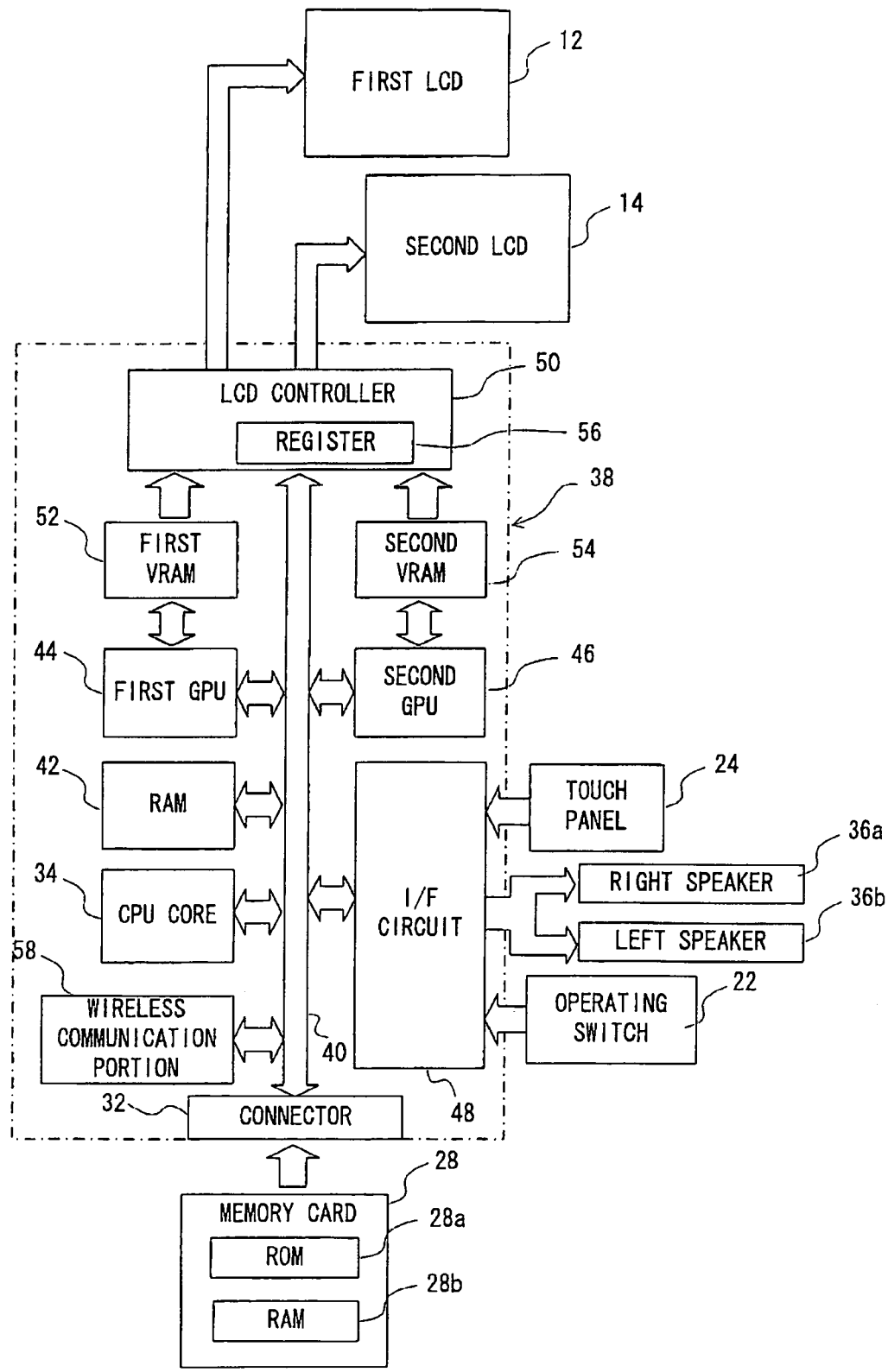
FIG. 2 is a block diagram showing an electric configuration of the movement controlling apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, a circuit component such as a CPU core 34, etc. is mounted. The CPU core 34 is connected to the above-described connectors 32 via a bus 40, and is connected with a RAM 42, a first graphics processing unit (GPU) 44, a second GPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc. As a save memory, a flash memory, or the like may be utilized.

The RAM 42 is utilized as a buffer memory or a working memory. That is, the CPU core 34 loads the program, the image data, the sound data, etc. stored in the ROM 28a of the memory card 28 into the RAM 42, and executes the loaded program.

Furthermore, the CPU core 34 executes a game process while storing data (game data, flag data, etc.) generated or obtained in correspondence with a progress of the game in the RAM 42.

Additionally, the game program, the image data, the sound data, etc. are read from the ROM 28a entirely at a time, or partially and sequentially so as to be stored into the RAM 42.

It should be noted that in the game apparatus 10, other applications except for the game may be executed, and in this case, a program in relation to an application and necessary data such as the image data may be stored in the ROM 28a of the memory card 28. Furthermore, sound (music) data may be stored as necessary.

Each of the GPU 44 and the GPU 46 forms a part of a rendering means, is constructed by, for example, a single chip ASIC, and receives a graphics command from the CPU core 34 to generate image data according to the graphics command. It should be noted that the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: polygon data, texture data, etc.) for executing the graphics command.

In addition, the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0".

Additionally, the LCD controller 50 outputs the image data created by the GPU 44 to the LCD 14, and outputs the image data created by the GPU 46 to the LCD 12 in a case that the data value of the register 56 is "1".

Furthermore, the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36a, 36b. Here, the operating switch 22 is the above-described switches 22a, 22b, 22c, 22d, 22e, 22f, 22g, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

The wireless communication portion 58 is a communication means for wirelessly transmitting and receiving data with another game apparatus 10 or communications equipment. Here, the weak radio wave transmitted and received by the game apparatus 10 in this embodiment is set in intensity to such a degree as not to be restricted by the Radio Law. When the CPU core 34 applies data such as game data, a command, etc. to the wireless communication portion 58, the wireless communication portion 58 modulates communication data to be transmitted to the opponent into a wireless signal and transmits it from an antenna. Furthermore, the wireless communication portion 58 receives a wireless signal from the opponent by the antenna to demodulate it to data, and applies the data to the CPU core 34. Via the wireless communication portion 58, the game apparatus 10 receives and sends data with another game apparatus 10 to execute a communication game. Additionally, the game apparatus 10 can connect to a network via the wireless communication portion 58 to thereby download a program and data from a server on the network and communicate with another game apparatus 10 via the network.

In the game apparatus 10, a movement of an operation object to be displayed on the LCD 14 is controlled by an input via the touch panel 24. More specifically, input coordinates on the touch panel 24 are detected for every predetermined time, and a distance between a straight line connecting previously detected input coordinates and currently detected input coordinates and an operation object is calculated. On the basis of the calculated distance, a movement velocity of the operation object is calculated to allow a movement control of the operation object.

Figure 3:
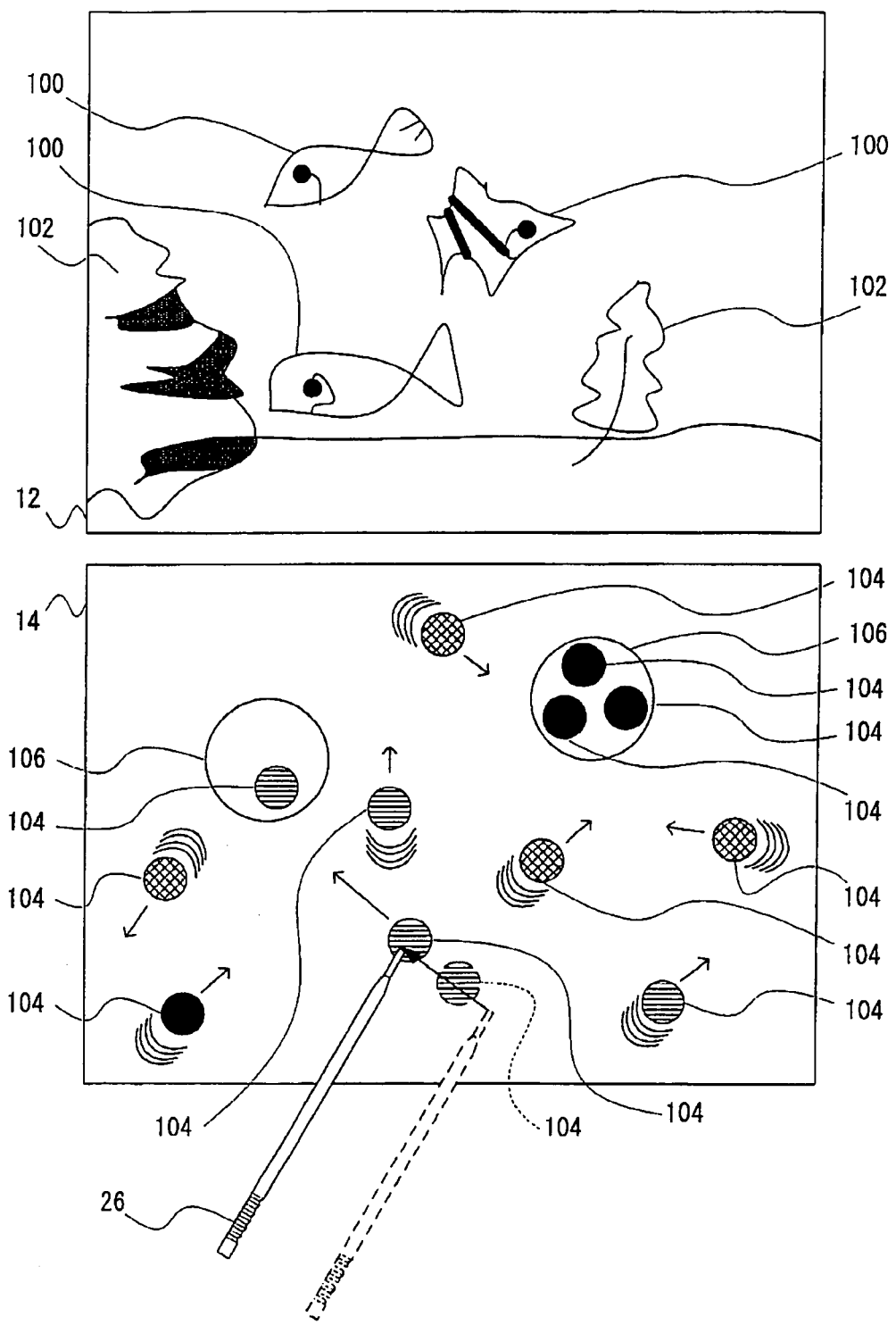
FIG. 3 is an illustrative view showing one example of a game screen.

Such a movement control can be applied to various games and applications. FIG. 3 shows one example of a game screen to which the movement control is applied. The game is a fish raising game. The upper screen displayed on the LCD 12 shows a condition under water where fishes 100, algae 102, etc. inhabit. On the other hand, the lower screen displayed on the LCD 14 is an input screen for a player, and the screen displays balls 104 and foams 106. The balls 104 are operation objects. The player is required to move a predetermined number of balls 104 with the same kind out of the plurality of kinds of balls 104 into a foam 106. For example, three kinds of red, green, blue balls 104 are prepared. Each ball 104 has initial values relating to a position, a movement velocity, a movement direction, etc., and moves at each velocity and in each direction.

Here, a restitution coefficient of the ball 104 is set to 1, and is taken into account when the balls 104 collides with each other. Furthermore, if a ball 104 goes out from a fixed area (display area) displayed as a game screen, the ball 104 is subjected to regular reflection by a circular wall provided outside the display area. At this time, the movement velocity of the ball 104 is reset to the initial velocity, and then, the ball 104 returns to the display area.

The player performs a stroking operation of the ball 104 on the touch panel 24 with the stick 26, etc. (sliding operation on the touch panel 24 with the stick 26, etc.) to exert an influence on the movement of the ball 104, that is, move the ball 104 into the foam 106. The movement of the ball 104 is controlled on the basis of the distance between the ball 104 and a straight line between the input coordinates as described above.

Here, in this game, when a ball 104 hits a foam 106, the ball 104 is absorbed in the foam 106. As long as a predetermined force is not imparted from outside by an input, etc. from the player, the ball 104 stays within the foam 106. If collecting predetermined number of balls 104 (three in this embodiment) within the foam 106 is successful, the foam 106 and the balls 104 are changed to an infinite number of fine foams which moves to the upper screen. This makes it possible to offer a predetermined advantage corresponding to the color of the ball 104 on the game screen of the LCD 12. More specifically, in a case of a red ball 104, the color of the fish 100 is cleared, the kind of the fish 100 is increased, and so forth. In a case of a green ball 104, the color of the algae 102 is cleared, the algae 102 grows larger, and so forth. Furthermore, in a case of a blue ball 104, the color of the water is cleared.

Figure 4:
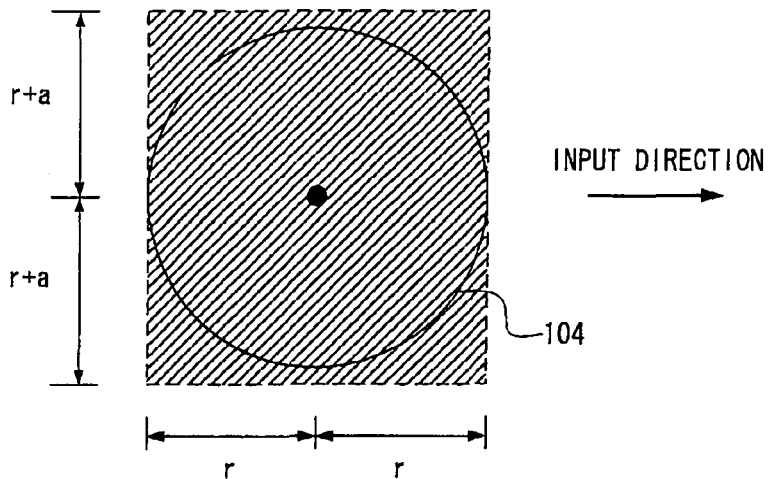
FIG. 4 is an illustrative view showing one example of a hit determining area set to an object.

In this embodiment, whether or not an input is reflected on the movement of the ball 104 is determined by a hit determination. FIG. 4 shows a hit determining area. A ball 104 as an object to be controlled in this embodiment is a circular object, and a hit determining area is set on the basis of a radius r of the object. In addition, the hit determining area is also set on the basis of an input direction, that is, a direction from previous input coordinates to current input coordinates. Since the player intuitively moves the stick 26, etc. to a direction to which he or she wants to move the ball 104, setting the hit determining area on the basis of the input direction allows proper determination whether or not an input by the player is valid or invalid, and adequate use of an input by the player for a movement control.

More specifically, as shown in FIG. 4, in relation to a direction vertical to the input direction, the radius "r" has a play "a", that is, a range of a distance "r+a" from the center of the object in both directions is validated. The play "a" is a constant, and may be set to be of the order of 0.1 r, for example. This makes it possible to validate even an input of brushing the object as well as an input of directly stroking the object, capable of performing an easy operation. It should be noted that in another embodiment, the play "a" need not to be provided.

On the other hand, in relation to the input direction in this embodiment, a range of a distance "r" from the center of the object in both directions is validated. Accordingly, the hit determining area of this embodiment is a rectangular area as shown in FIG. 4.

In this embodiment, when a line segment connecting previous input coordinates and current input coordinates intersects with the hit determining area, the input is validated. That is, only when an operation of pointing the ball 104 via the touch panel 24 is performed, a movement of the ball 104 can be operated. The hit determining area is an area slightly larger than the ball 104, capable of improving operability. For example, even if an input is made to the corner of the rectangle corresponding to the outside of the display area of the ball 104, the input can be validated to control the movement of the ball 104.

It should be noted that a line segment connecting previous input coordinates and current input coordinates is called an "input line segment", and a straight line connecting previous input coordinates and current input coordinates is called an "input straight line".

In this embodiment, whether or not an input line segment intersects with the hit determining area is performed in relation to a direction vertical to an input direction and the input direction.

Figure 5:
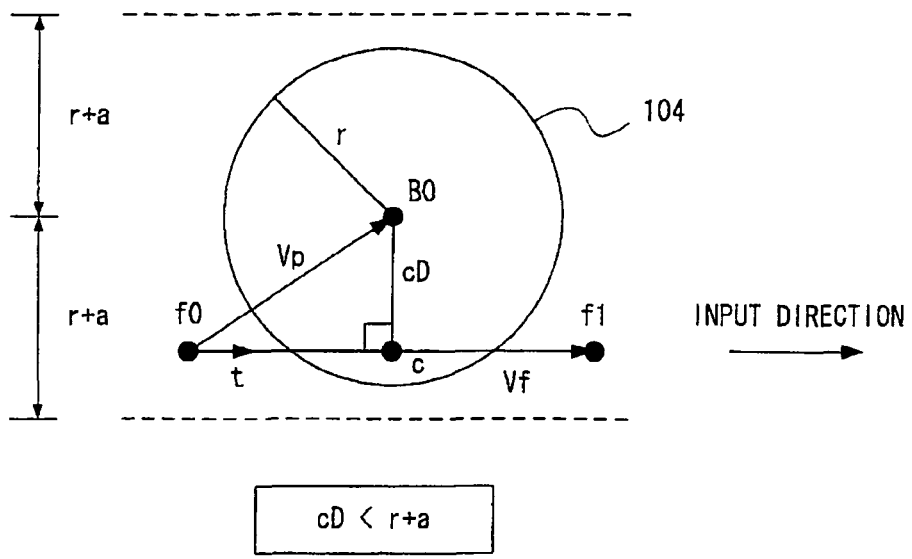
FIG. 5 is an illustrative view for explaining a hit determination in a direction vertical to an input direction.

FIG. 5 shows an illustrative view explaining a hit determination in a direction vertical to the input direction. The hit determination is performed on the basis of the distance between the ball 104 and an input straight line. A point f0 indicates a touched position detected in a previous frame (previous input coordinates), and a point f1 is a touched position detected in a current frame (current input coordinates). A vector Vf indicates a vector connecting the point f0 and the point f1, and t is a unit vector obtained by normalizing the vector Vf. A point B0 indicates a position of the center point of the ball 104 as a reference point, and a vector Vp indicates a vector connecting the point f0 and the point B0. A point c is a foot of a normal dropped from the point B0 with respect to the straight line (input straight line) connecting the f0 and the f1, that is, an intersection point between the input straight line and the normal passing through the point B0, and the coordinates of the point c are calculated by Equation 1.

$$c = f0 + t^*(Vp \cdot t)$$ [Equation 1]

Here, Vp·t indicates an inner product of the vector Vp and the vector t. The point c is the nearest point to the center point B0 of the ball 14 out of the points in the input straight line.

A distance cD between the center point B0 of the ball 14 and the point c is the distance between the input straight line and the ball 14, and by utilizing the distance cD, a hit determination in relation to a direction vertical to the input direction is performed. That is, it is determined whether or not cD<r+a.

Furthermore, FIG. 6 shows an illustrative view explaining a hit determination in an input direction. The hit determination in the input direction is performed on the basis of a value of L indicating the inner product of the vector Vp and the vector t. In order that the input line segment intersects with the determination area in the input direction, the point f0 need to exist at a position within the range of the distance r from the center point B0 of the ball 104 in the input direction as shown in FIG. 6(A). If the f0 exists at a limited position, the value of the inner product L (=Vp·t) is −r. In addition, as shown in FIG. 6(B), the point f1 need to exist at a position within the range of the distance r from the center point B0 of the ball 104 in a direction opposite to the input direction. If the f1 exists at a limited position, the value of the inner product L is a sum (r+|Vf|) of the radius r and the size of the vector Vf. Accordingly, as shown in FIG. 6(C), as to a hit determination in the input direction, it is determined whether or not −r<L<r+|Vf|.

Figure 7:
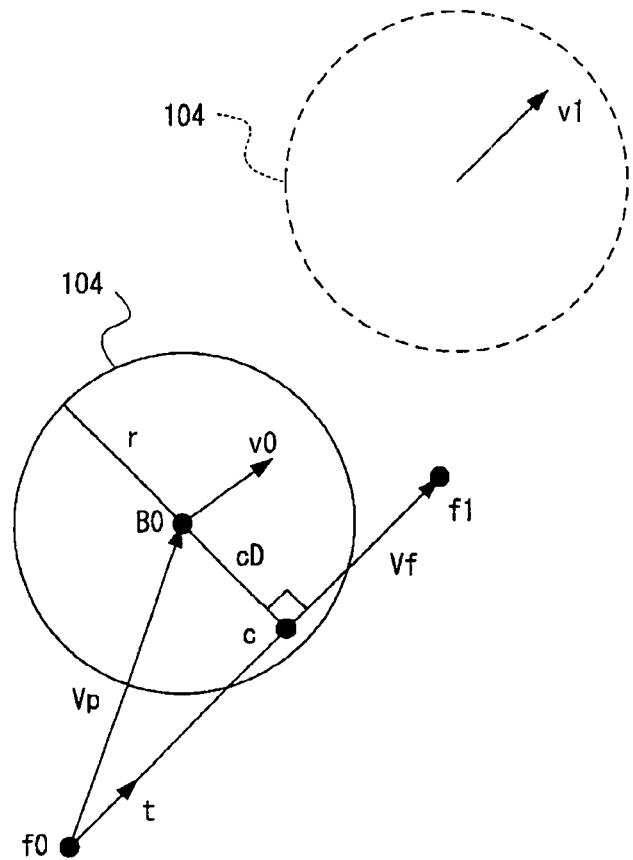
FIG. 7 is an illustrative view for explaining calculation of a movement velocity.

As shown in FIG. 7, if it is determined that the input line segment intersects with the determination area, a movement velocity of the ball 104 is calculated on the basis of the distance cD between the input straight line and the ball 104. When the movement velocity of the ball 104 in the current frame is v0, a movement velocity v1 of the ball 104 in a next frame is calculated according to a next Equation 2.

$$v1=v0+(f1-f0)*k*((r+a-cD)/(r+a))$$ [Equation 2]

Here, k is a constant (0<k<1), and set to an adequate value.

Thus, the shorter the distance cD between the ball 104 and the input straight line is, that is, the nearer the input by the player catches the center of the ball 104, the more an influence of the input on the movement velocity is. For example, in a case that an input is performed in a moving direction of the ball 104, as the distance cD is small, the movement velocity v is increased. Thus, it is possible to change the movement velocity depending on the distance between the input straight line and the ball 104, and control the movement of the ball 104 in various ways. Furthermore, the shorter the distance cD is, that is, the nearer the input line segment is to the center of the ball 104, the more an influence of the input is, so that it is possible to offer reality to the movement control.

In addition, the nearest point c to the center point B0 of the ball 104 in the input straight line is calculated, and a movement velocity is calculated on the basis of the distance cD between the nearest point c and the center point B0 of the ball 104. That is, since a movement velocity can be calculated on the basis of the shortest distance between the input straight line and the center point B0 of the ball 104, it is possible to change the movement velocity of the ball 104 depending on how accurately the position instructed via the touch panel 24 captures the ball 104.

Additionally, the movement velocity v1 is also calculated on the basis of a difference between the input coordinates (f1−f0). Thus, the movement of the ball 104 can be controlled in various ways according to a direction of an input, quickness (sliding operation) and a size of an input, capable of enhancing reality in movement.

Figure 8:
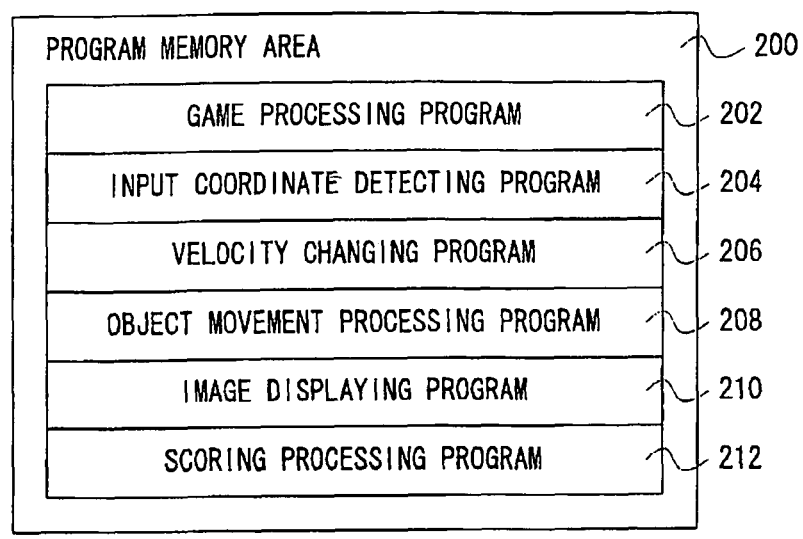
FIG. 8 is an illustrative view showing a program memory area in a memory map.

FIG. 8 shows a program memory area 200 in a memory map. It should be noted that in FIG. 8, a part of the program memory area 200 is shown, and in the program memory area 200, other programs necessary for processing like a sound outputting program, for example, are also stored.

In a memory area 202, a game processing program is stored. The game processing program is a program for processing a main routine of the game. In a memory area 204, an input coordinate detecting program is stored. The input coordinate detecting program is a program for detecting input coordinates indicating a position on the screen instructed by the player by means of the touch panel 24. By the program, input coordinates are detected for each predetermined time (one frame, for example).

In a memory area 206, a velocity changing program is stored. The velocity changing program is a program for changing a movement velocity of the object depending on an input. As described above, it is determined whether or not an input line segment intersects with a hit determining area of an object, and if the input line segment intersects it, a movement velocity is calculated on the basis of the distance between the input straight line and the object. In a memory area 208, object movement processing program is stored. The program is a program for controlling a movement of the object on the basis of a movement velocity. In a memory area 210, an image displaying program is stored. The program is a program for generating a game screen shown in FIG. 3 and displaying it.

In a memory area 212, scoring processing program is stored. The scoring processing program is a program for calculating a score of the player. In this embodiment, when a predetermined number of balls 104 are collected in the foam 106 with the same kind, the score of the color of the ball 104 is calculated. Then, depending on the score of the color, the game screen is changed. More specifically, on the basis of the score of red, the color of the fish 100 is cleared, the kind of the fish 100 is increased, and so forth. On the basis of the score of green, the color of the algae 102 is cleared, the algae 102 grows larger, and so forth. Furthermore, on the basis of the score of blue, the color of water is cleared. It should be noted that in another embodiment, a score of each color may merely be displayed on the screen.

Figure 9:
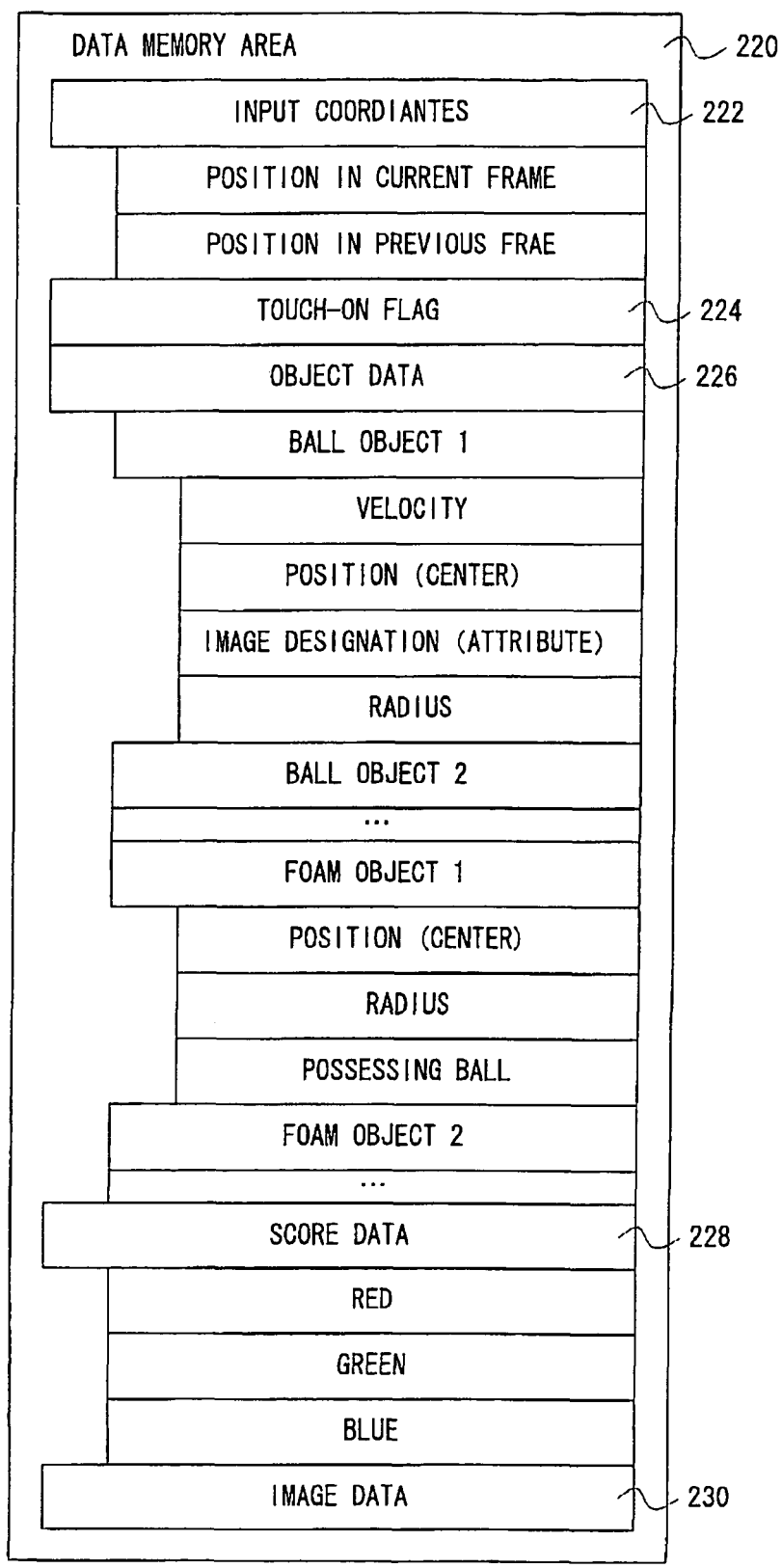
FIG. 9 is an illustrative view showing a data memory area in the memory map.

FIG. 9 shows a data memory area 220 in the memory map. Additionally, in FIG. 9, a part of the data memory area 220 is shown, and other data necessary for processing is also stored in the data memory area 220.

A memory area 222 is an input coordinate memory area, and stores input coordinates detected by the input coordinate detecting program. More specifically, coordinates of the point f1 indicated by a position detected in a current frame (current input coordinates), coordinates of the point f0 indicated by a position detected in a previous frame (previous input coordinates), etc. are stored.

In a memory area 224, a touch-on flag is stored. The touch-on flag is a flag whether or not an input is performed via the touch panel 24. The touch-on flag is set so as to be turned on when input coordinates are detected, and turned off when input coordinates are not detected.

A memory area 226 is an object data memory area, and stores data relating various objects such as a ball object 104, a foam object 106, a fish object 100, an algae object 102, etc.

More specifically, object data of a plurality of ball objects 104 existing in the game space are stored. The object data of the ball object 104 includes data in relation to a velocity, a position, an image designation, a radius, etc. The velocity data indicates a movement velocity of the ball 104. A predetermined initial value is set to the movement velocity. When a movement velocity is calculated according to an input according to the velocity changing program, the velocity data is updated to the calculated velocity. The position data indicates a position of the ball 104 in the game space. In this embodiment, the coordinates of the center point B0 are stored. When the object is moved according to the object movement processing program, the position data is updated to the moved position. The image designation data is data for designating image data to be used for displaying the ball 104. In this embodiment, since three kind of red, green and blue balls 104 are prepared, data with any one of the three colors is stored. Accordingly, the image designation data in this embodiment is also attribute data indicating an attribute or a kind of the ball 104. The radius data indicates a radius r of the ball 104.

Furthermore, object data of a plurality of foam objects 106 existing in the game space are stored. The object data of the foam object 106 includes data in relation to a position, a radius, and a possessing ball, etc. The position data indicates a position of the foam 106 in the game space. In this embodiment, as shown in FIG. 3, the foam 106 is a circular object, and the coordinates of the center point are stored. The radius data indicates a radius of the foam 106. The possessing ball data is information in relation to the ball 104 included in the foam 106, and stores the number of balls 104 within the foam 106, identification information, etc.

Although illustration is omitted in relation to other objects such as a fish object 100, an algae object 102, etc., necessary information such as a position, a color, a kind, etc. may be stored as object data.

In a memory area 228, score data is stored. According to the scoring processing program, scores of red, green, blue are calculated so as to be stored in the memory area 228. In a memory area 230, image data is stored. Image data of various objects, image data of a background, etc. are stored.

Figure 10:
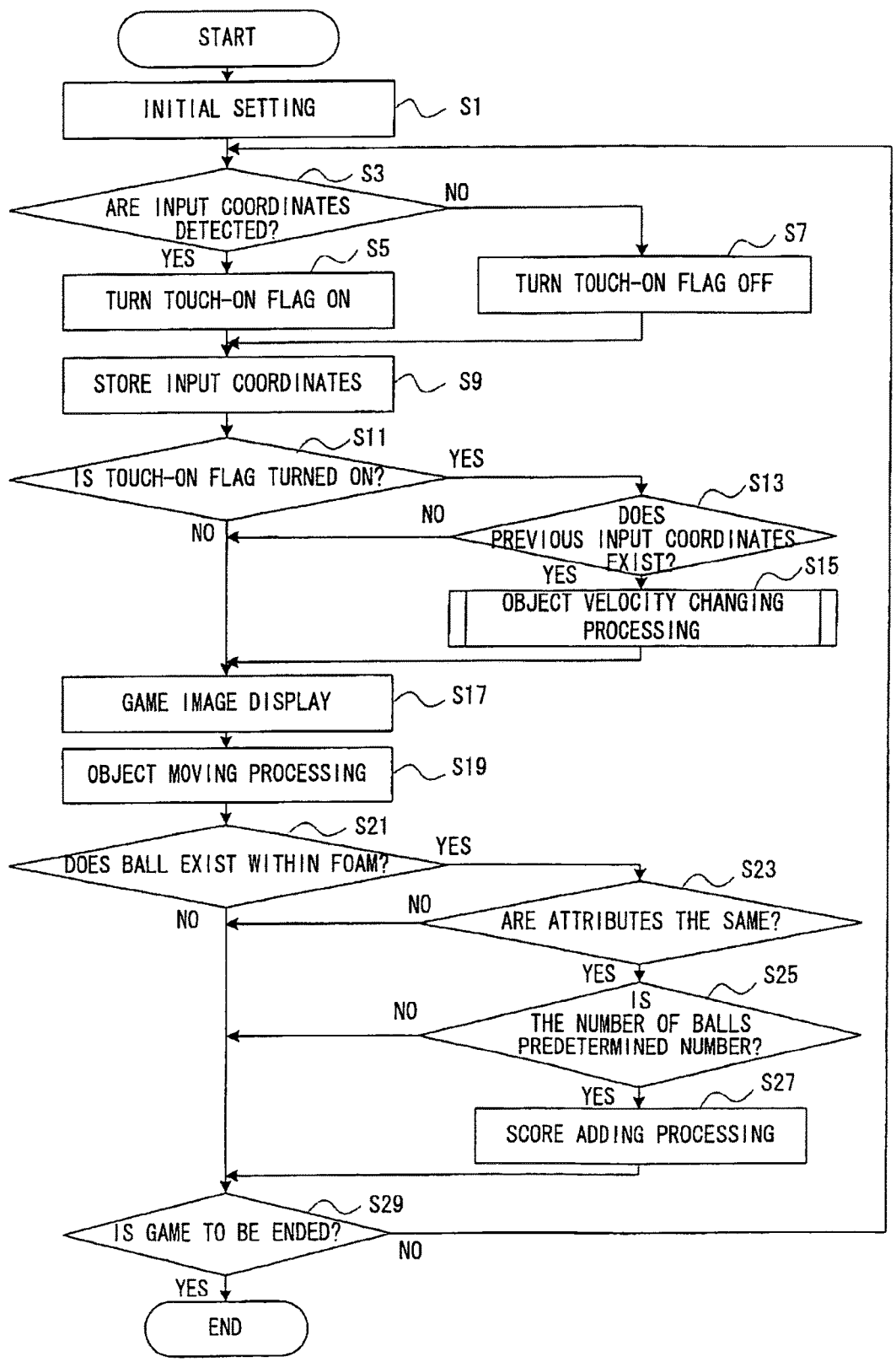
FIG. 10 is a flowchart showing one example of an operation of the movement controlling apparatus.

FIG. 10 shows one example of an operation of the game apparatus 10. When the processing is started, the CPU core 34 executes an initial setting in a step S1. Thus, an initial value is set to various variables, flags, etc.

Next, in a step S3, the CPU core 34 determines whether or not input coordinates are detected on the basis of data from the touch panel 24. If "YES" in the step S3, the CPU core 34 turns on the touch-on flag of the memory area 224 in a step S5. On the other hand, if "NO" is determined in the step S3, the CPU core 34 turns off the touch-on flag of the memory area 224 in a step S7.

In a succeeding step S9, the CPU core 34 stores input coordinates in the memory area 222. More specifically, information stored in the memory area 222 as a position in a current frame is stored as a position in a previous frame. In addition, in a case that input coordinates are detected, the input coordinates are stored as a position of the current frame. In a case that input coordinates are not detected, information indicating that there is no input is stored as a position of the current frame.

In a step S11, the CPU core 34 determines whether or not a touch-on flag of the memory area 224 is turned on. If "YES", the CPU core 34 determines whether or not previous input coordinates exists on the basis of the input coordinate data of the memory area 222 in a step S13. If "YES" in the step S13, by considering that a moving operation by the player is performed, and the CPU core 34 executes object velocity changing processing in a step S15. The operation of the object velocity changing processing is shown in detail in FIG. 11 described below.

If the processing in the step S15 is completed, or if "NO" is determined in the step S11 or S13, the CPU core 34 executes game image displaying processing in a step S17. Thus, the game screens as shown in FIG. 3 are generated by utilizing the GPUs 44 and 46, etc. and displayed on the LCDs 12 and 14.

In a step S19, the CPU core 34 executes object moving processing. This allows movement of each of the objects. A position of each ball object 104 is calculated and updated on the basis of a current position and a movement velocity stored in the memory area 226. If a player performs an operation for movement, a movement control is performed on the ball object 104 on the basis of the movement velocity changed by the object velocity changing processing in the step S15. Accordingly, by the processing in the step S17 in a next frame, a game screen in which the ball object 104 moves to a position on which the operation by the player is reflected is displayed.

In a succeeding step S21, the CPU core 34 determines whether or not a ball 104 exists within a foam 106. More specifically, a hit determination between each foam 106 and each ball 104 is performed on the basis of the information such as a position and a radius of each foam 106 and a position and a radius of each ball 104. Here, the position of the ball 104 which hits the foam 106 is changed to the position within the foam 106, and the movement velocity of the ball 104 is changed to zero. In addition, identification information of the ball 104 is stored as a possessing ball of the foam 106 which hits the ball 104.

If "YES" in the step S21, the CPU core 34 determines whether or not attributes of the balls 104 within the foam 106 are the same in a step S23. More specifically, it is determined whether or not all the balls 104 has the same image designation with reference to image designation data of the balls 104 corresponding to the identification information stored as a possessing ball of each foam 106.

If "YES" in the step S23, the CPU core 34 determines whether or not the number of the balls 104 within the foam 106 is a predetermined number in a step S25. More specifically, it is determined whether or not the number of identification information stored in each possessing ball data of each foam 106 is a predetermined number.

If "YES" in the step S25, the CPU core 34 executes score adding processing in a step S27. More specifically, a score of the balls 104 collected within the foam 106 is calculated for each attribute (color), and stored in the memory area 228. Although omitted in the flowchart, a change in response to the scoring processing is performed on each object. For example, since the predetermined number of balls 104 with the same attribute collected within the foam 106 disappear, these object data are deleted from the memory area 226. Furthermore, if the score of red is added, the color of the fish object 100 is changed on the basis of the score of the red, the kind of the fish is increased, and so forth. If the score of green is added, the color of the algae object 102 is changed on the basis of the score of green, the size thereof is changed, and so forth. Furthermore, if the score of blue is added, the color of water is changed on the basis of the score of blue. If "NO" in the step S21, S23 or S25, or if the processing in the step S27 is completed, the CPU core 34 determines whether or not the game is to be ended in a step S29. The game end condition is that the player instructs a game end by operating the predetermined operating switch 22 or by touching an end icon displayed on the lower screen, and that a predetermined time elapses from the start of the game, and so forth.

If "NO" is determined in the step S29, the process returns to the step S3. Accordingly, the processing from the step S3 is repeated in a next frame. On the other hand, if "YES" in the step S29, the game process is ended.

Figure 11:
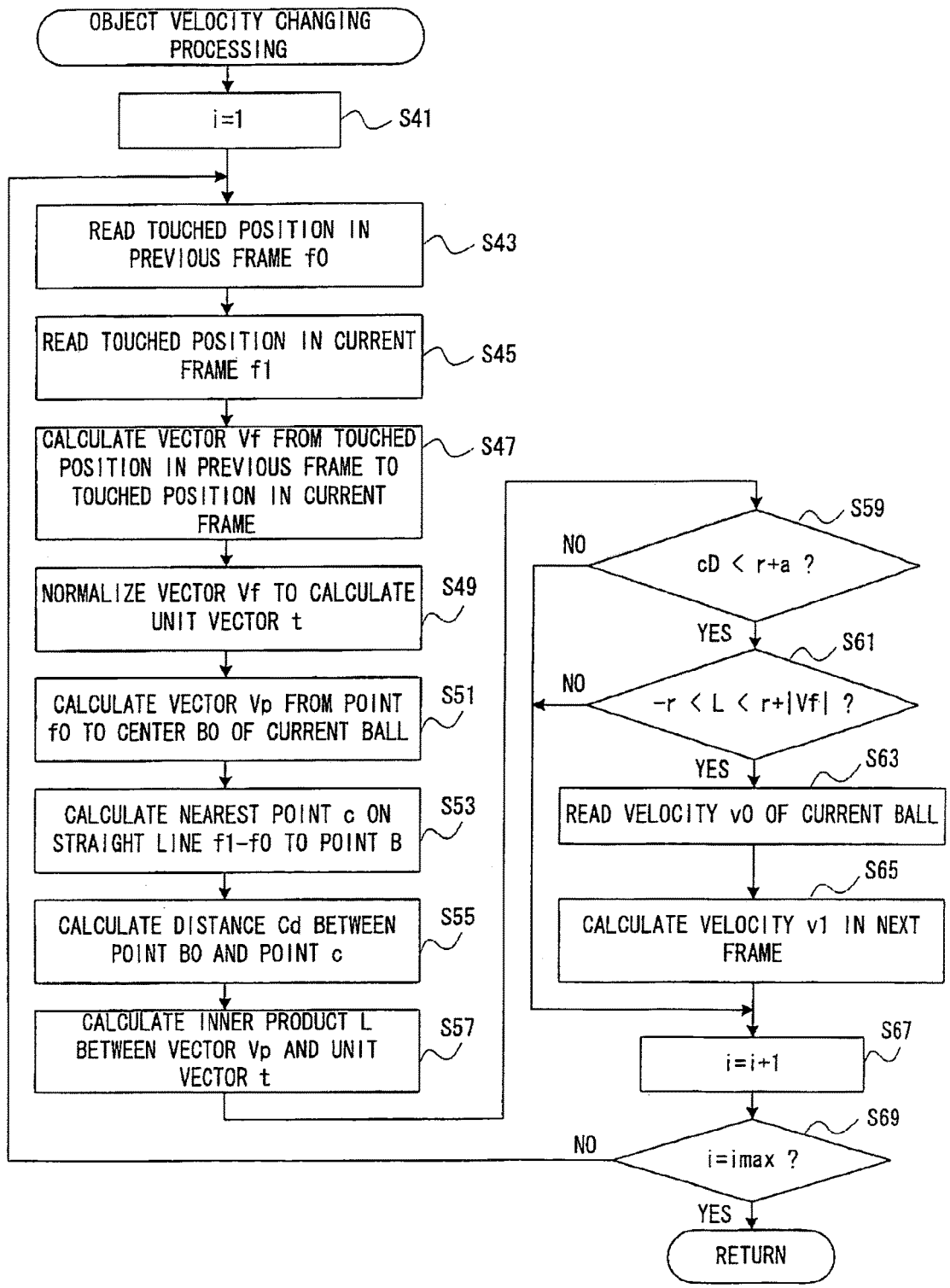
FIG. 11 is a flowchart showing one example of object velocity changing processing shown in FIG. 10.

FIG. 11 shows one example of an operation of the object velocity changing processing in the step S15 shown in FIG. 10. When the processing is started, the CPU core 34 sets an initial value 1 to a variable i for designating the ball object 104 in a step S41. The velocity changing processing in succeeding steps S43 to S65 is performed on the ball object 104 corresponding to the value of the variable i.

In the step S43, the CPU core 34 reads coordinates of a point f0 indicating a touched position in the previous frame from the input coordinates memory area 222. In the step S45, the CPU core 34 reads coordinates of the point f1 indicated by the touched position in the current frame from the input coordinates memory area 222. Then, in the step S47, the CPU core 34 calculates a vector Vf connecting the touched position f1) in the previous frame and the touched position f1 in the current frame. Furthermore, in the step S49, the CPU core 34 calculates a unit vector t by normalizing the vector Vf.

Succeedingly, in the step S51, the CPU core 34 calculates a vector Vp from the point f0 to the current center B0 of the ball 104. Here, the center B0 of the ball 104 is a position of the ball 104 corresponding to the variable i, and read from the memory area 226.

In the step S53, the CPU core 34 calculates the nearest point c on a straight line f1–f0 connecting the point f0 and the point f1 to the point B0. The coordinates of the point c is calculated according to the above-described Equation 1. Then, in the step S55, the CPU core 34 calculates a distance cD between the point B0 and the point c. Furthermore, in the step S57, the CPU core 34 calculates an inner product L between the vector Vp and the unit vector t.

In the succeeding steps S59 and S61, intersection between a hit determining area set to the ball 104 corresponding to the variable i and an input line segment (line segment connecting the point f0 and the point f1) by the player is determined. More specifically, in the step S59, the CPU core 34 executes hit determination in a direction vertical to the input direction, that is, determines whether or not cD<r+a is established, where r is a radius of the ball 104 corresponding to the variable i and read from the memory area 226, and a is a length of a play area, 10% of the radius r in this embodiment and calculated on the basis of the radius r.

If "YES" in the step S59, the CPU core 34 executes a hit determination in an input direction in the step S61, that is, determines whether or not −r<L<r+|Vf| is established. If "YES" in the step S61, since the hit determining area set on the basis of the input direction and the radius r intersects with the input line segment, the movement velocity of the ball 104 is changed depending on the input.

More specifically, in a step S63, the CPU core 34 reads a velocity v0 of the current ball 104, that is, reads a velocity of the ball 104 corresponding to the variable i from the memory area 226. Then, in a step S65, the CPU core 34 calculates a velocity in a next frame v1. The velocity v1 is calculated according to the above-described Equation 2, and stored in the memory area 226.

If the processing in the step S65 is completed, or if "NO" is determined in the step S59 or S61, the CPU core 34 increments the variable i in a step S67. This makes it possible to change the target to be varied in velocity to another ball 104. Then, in a step S69, the CPU core 34 determines whether or not the variable i is equal to a predetermined value imax. The predetermined value imax is a value larger than the total number of the balls 104 which exist in the game space or the display area by one. If "NO" is determined in the step S69, the process returns to the step S43 to perform velocity changing processing on the ball 104 corresponding to the updated variable i. On the other hand, if "YES" in the step S69, that is, if the velocity changing processing has been performed on all the balls 104, the object velocity changing processing is ended, and the process returns to the step S17 shown in FIG. 10.

According to this embodiment, it is possible to move the ball object 104 at the movement velocity v1 calculated on the basis of the distance cD between the straight line connecting the input coordinates and the ball object 104. Thus, the movement velocity of the ball object 104 can be changed depending on the distance cD between the ball object 104 and the input straight line, and thus can control the movement of the ball object 104 in various ways.

Furthermore, since the movement velocity v1 is calculated on the basis of the distance cD, in a case that a plurality of ball objects 104 exist, a movement velocity of each ball object 104 can be controlled on the basis of the distance cD between the input straight line and each of the ball objects 104. Thus, operability for the movement control of the ball object 104 is enhanced.

Figure 12:
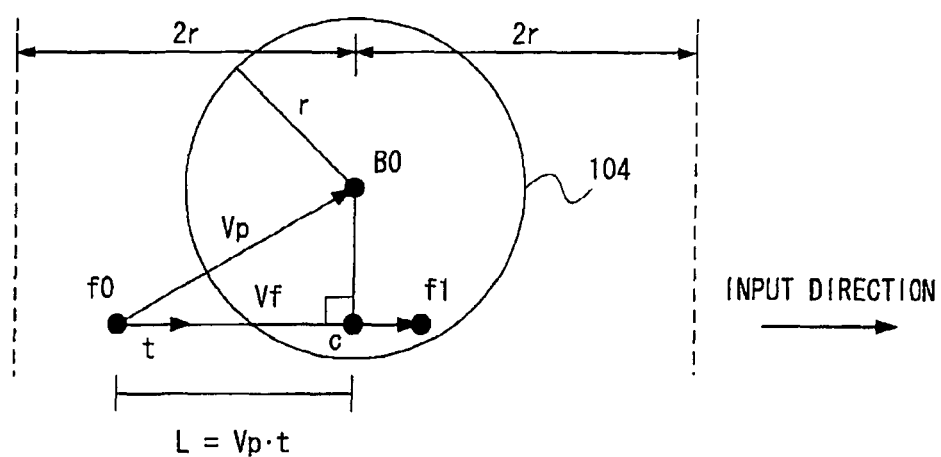
FIG. 12 is an illustrative view showing a modified example of a hit determination in an input direction.

Additionally, in the above-described embodiment, as shown in FIG. 6, a range from the center B0 of the ball object 104 by the radius r in both directions is set as a hit determining area in an input direction. However, in another embodiment, the hit determining area in the input direction may be set to a wider range. For example, as shown in FIG. 12, a range of 2 r from the center B0 of the ball 104 in both sides may be set as an effective area. In this case, it is determined whether or not −2 r<L<2 r+|Vf| is established in a hit determination in an input direction. In a case that the player makes an input to move the ball 104, it is considered that the player is apt to stroke a range wider than the display area of the ball 104 with the stick 26, etc. Accordingly, by setting a wider hit determining area in the input direction, more inputs can be validated, capable of improving operability. Additionally, it is also considered that the limitation in an input direction is not provided. In this case, even if an input from a position far away from the ball object 104 is made, if the input is within a determination area in a direction vertical to the input direction (that is, an input straight line intersects with a determination area), the movement of the ball object 104 can be controlled according to the input, realizing a simple operation.

Figure 13:
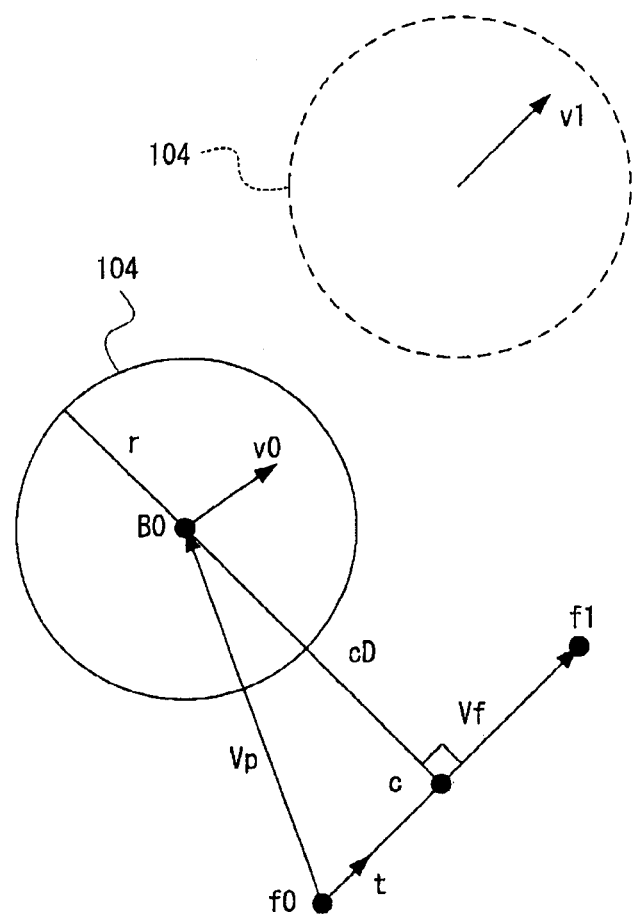
FIG. 13 is an illustrative view explaining calculation of a movement velocity in another embodiment.

Furthermore, in each of the above-described embodiments, that the input line segment or the input straight line intersects with the hit determining area is a condition. However, in another embodiment, without hit determination, that is, without regarding an intersection between an input line segment (or input straight line) and a determination area as a condition, a movement velocity of the ball object 104 may be calculated on the basis of the distance between the input straight line and the ball object 104. FIG. 13 shows one example of velocity calculation in this case. In FIG. 13, an input line segment connecting a point f0 and a point f1 exists at a position where it does not intersect with the display area of the ball object 104 and the hit determining area shown in FIG. 4 or FIG. 12. In such a case also, a distance cD between the center point B0 of the ball 104 and the input straight line is calculated, and a movement velocity of the ball 104 is calculated on the basis of the distance cD. The velocity of the ball 104 in a next frame v1 is calculated according to next Equation 3.

$$v1=v0+(f1-f0)*k*(1/cD) \qquad \text{[Equation 3]}$$

It should be noted that the constant k may be set to a value different from that in Equation 2.

As the distance cD is short, that is, as an input is performed at a position nearer to the center of the ball 104, much influence can be exerted on the movement of the ball 104.

Furthermore, since intersection between the ball 104 and the input is not needed, it is possible to operate movements of a plurality of balls 104 at a time. Since a velocity of each ball 104 is calculated on the basis of each distance between each ball 104 and an input straight line, it is possible to diversely change each of the movement velocities of each of the plurality of balls 104 at one input. Thus, it is possible to control the movement of the ball 104 in various ways.

Furthermore, in the above-described FIG. 13 embodiment, the movement velocity is calculated on the basis of the distance cD between the input straight line and the center point B0 of the ball 104, that is, the distance in a direction vertical to an input direction. However, in another embodiment, a distance between an input line segment in the input direction and the center point B0 of the ball 104 may be taken into account. For example, when a perpendicular line dropped from the center point B0 to an input line segment does not intersect with the input line segment, a movement velocity may be calculated further based on the distance between the input line segment in the input direction and the center point B0.

More specifically, as shown in FIG. 14(A), when the point f0 exists nearer to the side of the input direction than the center point B0 (that is, the inner product is L<0), the velocity in a next frame v is calculated according to Equation 4, for example. On the other hand, if the point f1 exists nearer to the side opposite to the input direction than the center point B0 (that is, when the inner product is L>|Vf|), the velocity in the next frame v1 is calculated according to Equation 5, for example.

$$v1=v0+(f1-f0)*k*(1/cD)*(1/|L|) \quad \text{[Equation 4]}$$

$$v1=v0+(f1-f0)*k*(1/cD)*(1/(L-|Vf|)) \quad \text{[Equation 5]}$$

In either case, the farther the input line segment is away from the center point B0 in the input direction, the less the influence on the movement of the ball 104 is.

Additionally, in each of the above-described embodiments, a target to be operated is a circular object, but the shape of the object is not limited to a circle, and can be changed as necessary. For example, other shapes like a polygon such as a quadrangle, a triangle may be applied. The position, as a reference point, for calculating a distance between the input straight line and the object may not be limited to the central point of the operation object B0, and may be set to an arbitrary position like the center of gravity, for example. Furthermore, the value of the distance r for defining the hit determining area is set as necessary in view of a position of the reference point, a shape and a size of an object, etc.

Additionally, in each of the above-described embodiments, a touch panel 24 is used as a pointing device for instructing an arbitrary position on a screen by the player, but in another embodiment, other pointing devices such as a pen tablet, a touch pad, a computer mouse, etc. may be used. However, an instruction image like a mouse pointer for showing an instructed position on the screen has to be displayed.

Although the above example embodiments have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing computer-readable instructions for controlling a virtual object that is processed by a computing system that includes a display for displaying the virtual object and a user input device configured to receive input from a user to control the virtual object, the stored computer-readable instructions comprising instructions configured to cause said computing system to:
    detect a first input provided to the user input device;
    detect a second input provided to the user input device;
    determine a first position based on the detected first input;
    determine a second position based on the detected second input;
    calculate a distance between a reference point of the virtual object and an intersection point that is located between the determined first position and the determined second position;
    calculate a movement velocity of said virtual object based at least in part on the calculated distance; and
    move said virtual object based at least in part on the calculated movement velocity.

2. The medium of claim 1, wherein the calculated movement velocity increases as the calculated distance decreases.

3. The medium of claim 1, wherein a first line from the reference point to the intersection point and a second line from the first position to the second position form an angle that is substantially ninety degrees.

4. The medium of claim 3, wherein the instructions are further configured to cause said computing system to:
    determine an input direction based at least in part on the first position and the second position;
    establish a hit detection area based at least in part on the determined input direction, the hit detection area encompassing the reference point; and
    assert an intersection of the hit detection area and the second line,
    wherein the calculation of the movement velocity is additionally based on the asserted intersection.

5. The medium of claim 1, wherein the instructions are further configured to cause said computing system to calculate a difference between the first position and the second position,
    wherein the calculated movement velocity is further based on the calculated difference.

6. A movement controlling apparatus comprising:
    at least one display screen configured to display at least one virtual object;
    a user input device configured to accept at least a first input and a second input that are each associated with a position on the at least one display screen;
    a processing system configured to:
        determine a first indicated position based on the first accepted input;
        determine a second indicated position based on the second accepted input;
        calculate a distance between a reference point of the at least one virtual object and an intersection point that is located between at least the determined first indicated position and the determined second indicated position;
        calculate a movement velocity of the at least one virtual object based at least in part on the calculated distance; and
        move the at least one virtual object based at least in part on the calculated movement velocity.

7. The apparatus of claim 6, wherein the processing system is further configured to calculate an increase of the movement velocity as the calculated distance decreases.

8. The apparatus of claim 6, wherein a first line from the reference point to the intersection point and a second line from the first indicated position to the second indicated position form an angle that is substantially ninety degrees.

9. The apparatus of claim 8, wherein the processing system is further configured to:
    determine an input direction based at least in part on the first indicated position and the second indicated position;
    establish a hit detection area based at least in part on the determined input direction, the hit detection area encompassing the reference point; and
    perform a determination to determine if there is an intersection of the hit detection area and the second line,
    wherein the calculated movement velocity is based on the determination.

10. The apparatus of claim 6, wherein the processing system is further configured to:
    calculate a difference between the first indicated position and the second indicated position,
    wherein the calculated movement velocity is based on the calculated difference.

11. A computer implemented method for controlling a virtual object of a computing system that includes a display for displaying the virtual object, a user input device configured to receive input from a user to control the virtual object, and at least one processor, the method comprising:

detecting first input coordinates that are associated with a screen of the user input device;

detecting second input coordinates that are associated with the screen of the user input device calculating, via the at least one processor, a distance between a reference point of the virtual object and an intersection point that is located between the first input coordinates and the second input coordinates;

calculating, via the at least one processor, a speed value of said virtual object based at least in part on the calculated distance; and moving said virtual object based at least in part on the calculated speed value.

12. The method of claim 11, wherein the calculated speed value increases as the calculated distance decreases.

13. The method of claim 11, wherein a first line from the reference point to the intersection point and a second line from the first input coordinates to the second input coordinates form an angle that is substantially ninety degrees.

14. The method of claim 13, further comprising:

determining an input direction based at least in part on the first input coordinates and the second input coordinates;

establishing a hit detection area based at least in part on the determined input direction, the hit detection area encompassing the reference point; and asserting an intersection of the hit detection area and the second line, wherein the calculated speed value is additionally based on the asserted intersection.

15. The method of claim 11, further comprising:

calculating a difference between the first input coordinates and the second input coordinates, wherein the calculated speed value is further based on the calculated difference.

16. A computing system for controlling movement of at least one virtual object, the system comprising:

at least one display screen configured to display the at least one virtual object;

a user input device configured to accept input that specifies positions on the at least one display screen;

a processing system that includes at least one processor, the processing system configured to:

determine a first position based on a first input provided via the user input device;

determine a second position based on a second input provided via the user input device;

calculate a distance between a reference point of the at least one virtual object and an intersection point that is located between the first position and the second position;

calculate a velocity of the at least one virtual object based at least in part on the calculated distance; and move the at least one virtual object based at least in part on the calculated velocity.

17. The medium of claim 1, wherein the calculated movement velocity varies as the calculated distance varies.

18. The medium of claim 1, wherein the first position is a first set of coordinates associated with the display and the second position is a second set of coordinates associated with the display.

* * * * *